United States Patent
Stauder et al.

(10) Patent No.: US 9,661,299 B2
(45) Date of Patent: May 23, 2017

(54) OUTLIER DETECTION FOR COLOUR MAPPING

(75) Inventors: Jürgen Stauder, Montreuil/ille (FR); Hasan Sheik Faridul, Cesson Sevigne (FR); Jonathan Kervec, Paimpont (FR)

(73) Assignee: Thomson Licensing, Issy-les-Moulineaux (FR)

( * ) Notice: Subject to any disclaimer, the term of this patent is extended or adjusted under 35 U.S.C. 154(b) by 681 days.

(21) Appl. No.: 13/535,321

(22) Filed: Jun. 27, 2012

(65) Prior Publication Data

US 2013/0002810 A1 Jan. 3, 2013

(30) Foreign Application Priority Data

Jun. 30, 2011 (EP) .................................... 11305842

(51) Int. Cl.
*H04N 13/00* (2006.01)
*H04N 13/02* (2006.01)
(52) U.S. Cl.
CPC ..... *H04N 13/0037* (2013.01); *H04N 13/0025* (2013.01); *H04N 13/0257* (2013.01)
(58) Field of Classification Search
None
See application file for complete search history.

(56) References Cited

U.S. PATENT DOCUMENTS 7,796,812 B2 9/2010 Pitie et al.
2006/0244983 A1 11/2006 Zeng
2009/0052776 A1* 2/2009 Panahpour Tehrani . H04N 9/68
382/167
2012/0189191 A1* 7/2012 Bai et al. ...................... 382/154

FOREIGN PATENT DOCUMENTS

GB 2 432 472 A 5/2007

OTHER PUBLICATIONS

Qi Wang, Xi Sun, and Zengfu Wang. A Robust Algorithm for Color Correction between Two Stereo Images. In Proc. ACCV, vol. 5995, pp. 405-416. 2010.*
Ben-Gal, "Outlier detection", Data Mining and Knowledge Discovery Handbook: A Complete Guide for Practitioners and Researchers, Kluwer Academic Publishers, 2005.
Efros, "Feature Matching and RANSAC", 15-463: Computational Photography, CMU, Fall, 2005.
Fecker et al., "Histogram-Based Prefiltering for Luminance and Chrominance Compensation of Multiview Video", IEEE Transactions on Circuits and Systems for Video Technology, vol. 18, No. 9, Sep. 2008, pp. 1258-1267.
Held, "K-Means Clustering for Automatic Image Segmentation", Jun. 2008, with English translation.
Jiang et al., "Correlation-based Intrinsic Image Extraction from a Single Image", Computer Vision—ECCV 2010, Copyright 2010, pp. 58-71.

(Continued)

*Primary Examiner* — Kevin McInnish
(74) *Attorney, Agent, or Firm* — Myers Wolin, LLC

(57) ABSTRACT

A method and an arrangement for an improved outlier detection for color mapping. Spatial neighborhoods of feature points are used for outlier detection. For this purpose, Geometric Feature Correspondence neighborhoods of an initial color-corrected test-image and a reference image are compared in a neighborhood comparator.

22 Claims, 9 Drawing Sheets

(56) References Cited

OTHER PUBLICATIONS

Jung et al., "Color Corrected Newspaper Sequence for 3D Video Coding", ISO/IEC JTC1/SC29/WG11, MPEG2011/Mxxxxx, Daegu, South Korea, Jan. 2011.
Jung et al., "Color Correction Algorithm based on Camera Characteristics for Multi-view Video Coding", published online May 25, 2012.
Lowe "Distinctive Image Features from Scale-Invariant Keypoints", International Journal of Computer Vision, Jan. 5, 2004.
Pitié et al., "Automated Colour Grading Using Colour Distribution Transfer", Feb. 22, 2007.
Pitié et al., "The Linear Monge-Kantorovitch Linear Colour Mapping for Example-Based Colour Transfer", in Proc. 4th Eur. Conf. Visual Media Production, 2007 IETCVMP, 2007, pp. 1-9.
Reinhard et al., "Color Transfer between Images", IEEE Computer Graphics and Applications, Sep./Oct. 2001, pp. 34-41.
Tehrani et al., "Iterative colour correction of multicamera systems using corresponding feature points", J. Vis. Commun. Image R., published online Apr. 4, 2010, pp. 377-391.
Yamamoto et al., "Color Correction for Multi-view Video Using Energy Minimization of View Networks", International Journal of Automation and Computing, Jul. 2008, pp. 234-245.
Yao et al., "Color transfer via local binary patterns mapping", Proceedings of 2010 IEEE 17th International Conference on Image Processing, Hong Kong, Sep. 26-29, 2010, pp. 1825-1828.
Zaveri et al., "An Optimized Region-based Color Transfer Method for Night Vision Application", 2010 International Conference on Signal and Image Processing, copyright IEEE 2010, pp. 96-101.
Zeileis, "K-means clustering in R", Feb. 20, 2009, with English translation.
Hasan et al., "Robust Color Correction for Stereo", 2011 Conference for Visual Media Production (CVMP), Nov. 16, 2011, London, England, pp. 101-108.

* cited by examiner

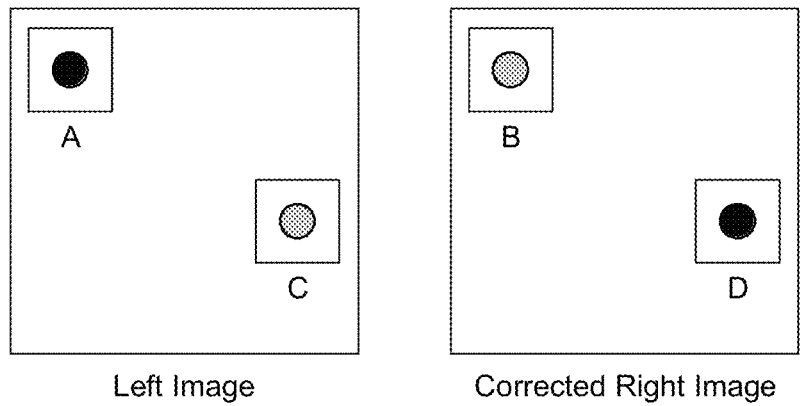
Left Image    Corrected Right Image
Fig. 4
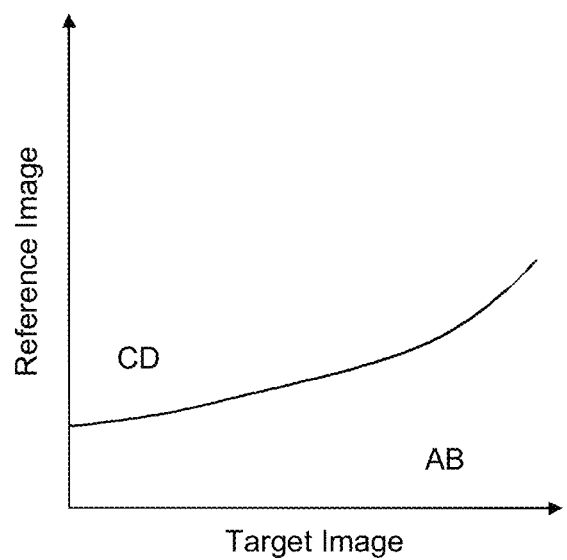
Fig. 5 - Prior Art

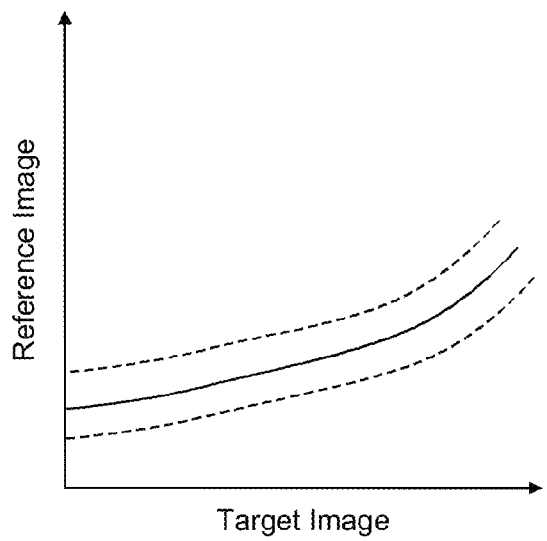
Fig. 6 - Prior Art
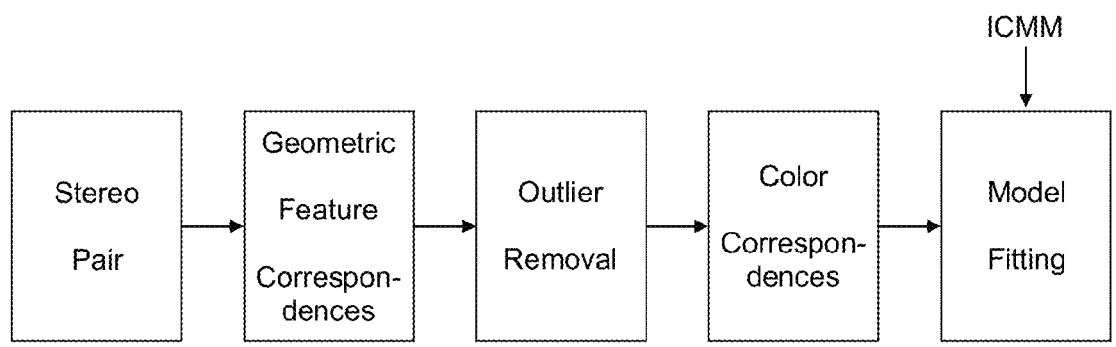
Fig. 7 - Prior Art
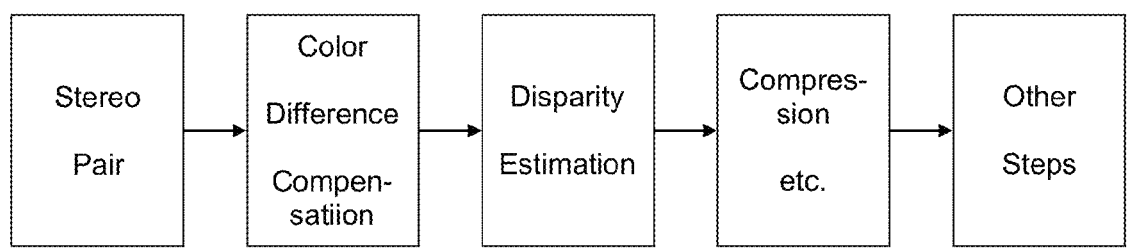
Fig. 8 - Prior Art

OUTLIER DETECTION FOR COLOUR MAPPING

This application claims the benefit, under 35 U.S.C. § 119 of EP patent application Ser. No. 11305842.4, filed 30 Jun. 2011.

FIELD OF THE INVENTION

The invention relates to a method and arrangement for improved outlier detection for color mapping of multiple views based applications such as stereoscopic or 3-D imaging.

BACKGROUND

Applications involving multiple views of the same scene, such as stereo imaging in the meaning of stereoscopic or 3-D imaging, or applications involving multiple versions of originally the same image, such as two different scans of the same film negative, suffer from geometric differences and color differences between corresponding images. Stereoscopic imaging or real 3D requires a minimum of two pictures simulating our two eyes, the left image and the right image. Geometric differences can be caused by parallax in case of stereo images and by cropping, zoom, rotation or other geometric transforms in case of film scans. Color differences are caused, for example, by non-calibrated cameras, non-calibrated film scanners, automatic exposure settings, automatic white balancing or even physical light effects in the scene. Color difference compensation is often the first step in image or video signal processing of multiple view or stereoscopic pictures, as other steps, such as disparity estimation or data compression, benefit from reduced color differences. One approach for the compensation of color differences between images is color mapping, also called tone mapping, which is applied for color transformation. Color mapping has the task of remapping the color coordinates of an image such that they are suitable for further color signal processing, color signal transmission, or color reproduction. Color mapping typically starts with finding Geometric Feature Correspondences [1], in the following abbreviated GFCs, using methods such as Scale Invariant Feature Transformation [2], in the following abbreviated SIFT, or simply using a normalized cross correlation [3]. GFCs are a list of pairs of corresponding feature points in multiple views, for example the left image and the right image. GFCs allow coping with the geometric differences between left and right images. As GFC computation is not free from errors, some of the corresponding feature points are wrong and are so-called outliers. Wrong corresponding feature points are not positioned on the same semantic image detail in the left image and in the right image. In a subsequent step, those outliers are usually removed from the GFCs. Color coordinates, such as e.g. R, G, and B for red, green and blue, are then retrieved from the two images using the feature correspondences. In the following, these retrieved colors will be called Color Correspondences, abbreviated by CCs. Finally, the CCs are used to fit a color mapping model. Said outlier removal step is significant because, for example, if a GFC lies in a highly textured region, a small error in spatial position of the GFC can generate a large error in the CC. Therefore, an improved outlier detection is desirable.

INVENTION

A problem to be solved by the invention is to provide a method and an arrangement for improved outlier detection which avoids errors of known outlier removal methods. One known outlier detection method is to remove outliers directly after calculation of GFCs [4]. This method rejects a sample GFC as outlier if it does not match a geometric transformation model that is estimated from all GFCs. A known error of this method is that the geometric transformation model may not be able to describe all geometric differences between left and right images, notably at high depth dynamics. A second known outlier detection method is to reject a sample CC in the framework of robust estimation of an initial color mapping model [5]. This method rejects a sample CC as outlier if an initial estimated color mapping model is far from the sample CC. This outlier detection technique misses a wide range of true outliers as well as mistakenly detects some truly valid CCs as outliers. Another error is inconsistency between color channels, caused, for example, by applying a color mapping model per channel without cross checking of outlier decisions between color channels.

It is an aspect of the invention to reduce the number of false negatives, which means to reduce the number of cases where a sample is detected as valid but truly is an outlier. Reducing false negatives is important as the color mapping model can be influenced by those missed outliers.

It is a further aspect of the invention to reduce the number of false positives in outlier detection, which means to reduce the number of cases where a Color Correspondence is detected as an outlier but truly is not an outlier, in order to provide more valid information for an improved color mapping model.

Although it may be assumed that outlier detection in general is limited by the characteristics of the applied outlier removal method, as outliers are removed after computing Geometric Feature Correspondences, improved outlier detection for color mapping even in the presence of outliers and high depth dynamics shall be provided.

According to the present invention, improved outlier detection is provided by a method and an arrangement which exploit the spatial neighborhood of Geometric Feature Correspondences in left and right stereo images in order to remove outliers from the Geometric Feature Correspondences. That means that the decision to use or not to use a feature point is not only based on the feature point itself, but on the spatial neighborhood of the corresponding feature point in the original image and the target image. For example, the left image of two images is used as reference image and the right image is used as test image.

Therefore, for a given n-tuple of input images and an initial set of n-tuples of corresponding feature points between the images of the n-tuple of input images, each feature point of an n-tuple of corresponding feature points being an image position in the corresponding image of the n-tuple of images, respectively, the following steps are performed:

estimating an initial color mapping model capable of compensating image colors of the corresponding feature points of said set of n-tuples of corresponding feature points, the initial color mapping model being a color transform, defining a spatial neighborhood for each feature point in each image of said n-tuple of input images, for all n-tuples of said set of n-tuples of corresponding feature points, compensating color differences of the feature points and their spatial neighborhoods using said initial color mapping model, rejecting as outlier those n-tuples of corresponding feature points that have remaining color differences larger than a threshold to obtain a reduced set of n-tuples of corresponding feature points, estimating a refined color mapping model capable of compensating image colors of the reduced set of n-tuples of corresponding feature points, the refined color mapping model being a color transform, and setting the initial color mapping color transform to said refined color mapping color transform and repeating the above steps.

An n-tuple is a sequence or ordered list of n elements, where n is a positive integer.

The method may be varied by adapting the threshold for remaining color differences to the color signal, for example setting it to a multiple of the color difference before color mapping or after color mapping, or using color ratios instead of color differences.

The outlier detection for color mapping is based on the principle that e.g. a left image of a stereo pair of images is determined as reference image, whereas the right image of the stereo pair is determined as test image, or vice versa, and for said images Geometric Feature Correspondences and Color Correspondences are computed first. Then, a color mapping model, e.g. a model including parameters for gamma, offset and gain, is estimated and used to obtain an initial color-corrected test image. It is important to note that this initial color correction uses all Color Correspondences including outliers.

Then, Geometric Feature Correspondence neighborhoods of the initial color -corrected test image and the reference image are compared. As the test image is already initially color corrected, the color characteristics of the neighborhoods of an n-tuple out of the set of n-tuples of corresponding feature points should be close, i.e. the remaining color differences in the neighborhoods should be below a threshold. If the neighborhood differences for an n-tuple are below said threshold then the Color Correspondence corresponding to this n-tuple is decided to not to be an outlier, and vice-versa. The threshold is determined as a multiple of a variance of an estimation error.

Experimental results have shown that the proposed method for outlier detection allows increasing the number of true positive detected outliers without increasing the number of false positive detected outliers. As the proposed method determines outliers by comparing the neighborhood, the size of the neighborhood has an important impact on the performance of outlier detection. It has been observed that up to a certain threshold with increasing neighborhood size the outlier detection performance also increases.

Advantages of the recommended outlier detection for color mapping are, for example, that it is easier to analyze a partially color-corrected image—the initially corrected test image—than a non color-corrected image. The exploitation of spatial neighborhood of the initial color-corrected test image improves the outlier detection with regard to robustness and reliability of color mapping.

The recommended method for outlier detection is realized by an arrangement comparing the spatial neighborhood of the corresponding feature points in the original and the target image and is e.g. provided in a camera or film scanner for processing stereoscopic images.

The specific nature of the invention as well as other objects, advantages, features and uses of the invention will become evident from the following description of a preferred embodiment taken in conjunction with the accompanying drawings.

DRAWINGS

Exemplary embodiments of the invention are described with reference to the accompanying drawings, which show in:

FIG. 1 a flowchart of outlier detection according to the invention;

FIG. 2 a flowchart of valid CC detection;

FIG. 3 a schematic illustrating the result of neighborhood comparison;

FIG. 4 a schematic illustrating a sample situation where prior art outlier removal fails;

FIG. 5 a diagram illustrating false positive detected outliers;

FIG. 6 a diagram illustrating a prior art method to remove outliers;

FIG. 7 a schematic illustrating basic steps of color mapping;

FIG. 8 a schematic illustrating color difference compensation as a first step of stereo image processing;

FIG. 9 a block diagram of outlier detection according to the invention;

FIG. 10 a block diagram illustrating an arrangement for outlier detection according to the invention;

FIG. 11 illustrates a reference image R, a test image T, and an initial color -corrected test image C of a building;

FIG. 12 a diagram illustrating red channel estimation of a scene 'Building';

FIG. 13 a diagram illustrating green channel estimation of the scene 'Building';

FIG. 14 a diagram illustrating blue channel estimation of the scene 'Building';

FIG. 15 a table illustrating a 3×3 pixel block neighborhood comparison;

EXEMPLARY EMBODIMENTS

Figure 1:
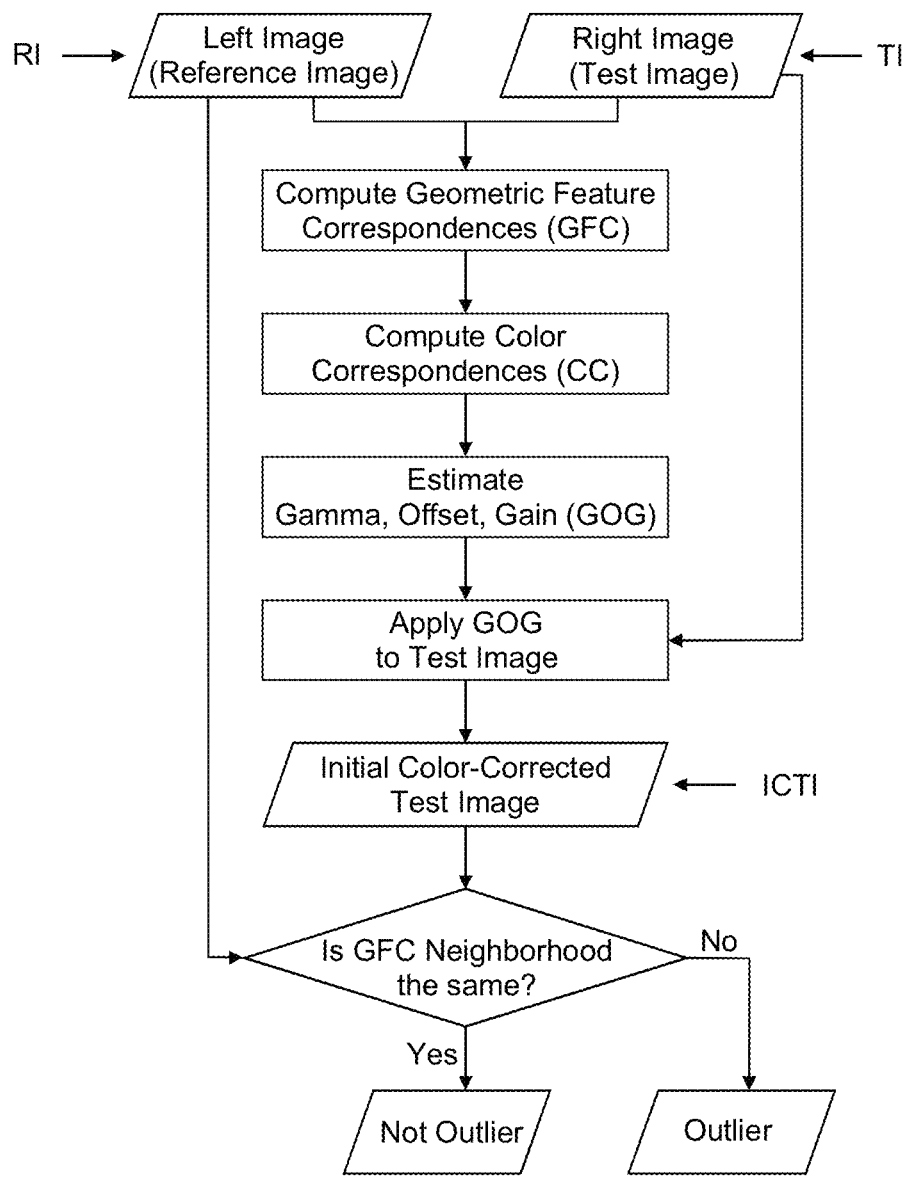

In the framework of stereo imaging, 3D video content needs to be created, processed and reproduced on a 3D capable screen. Processing of 3D video content allows creating or enhancing 3D information, as for example disparity estimation, or enhancing 2D images using 3D information, as for example view interpolation. Often 3D video content is created from two or more captured 2D videos. By relating the two or more views of the same scene in a geometrical manner, 3D information can be extracted.

In video processing for stereo imaging, issues are color differences between the two or more views of the same scene. These differences may result, for example, from physical light effects or from uncalibrated cameras. It would be preferable if such color differences could be compensated.

The compensation of such color differences will help a series of applications. For example, when a stereo video sequence is compressed, compensation of color differences can reduce the resulting bitrate. So, stereo compression algorithms benefit from the compensation of color differences. Another example is the 3D analysis of stereo sequences. When color differences are compensated, disparity estimation can be more precise. Another example is 3D assets creation for visual effects in post-production. When color differences in a multi-view sequence are compensated, extracted texture for 3D objects will have better color coherence. Another example is the generation of 3D object models from still images. In this case, the texture of the object is extracted from the still images and color differences between the still images have to be modeled and compensated. The challenge is similar for image stitching. Note that, for the 3D object model creation or for image stitching, the color inconsistency mainly stems not from the camera calibration but from the configurations, such as automatic white balancing, automatic exposure settings, 3D lighting effect etc.

Known methods for the compensation of color differences in input images can be divided into two groups: color mapping and color transfer. Usually, two images are processed and the goal is to describe the color transform that allows transforming the colors of the first image into the colors of the second image.

In color mapping, it is assumed that geometrical correspondences between the input images are available. Geometrical correspondences can be automatically extracted from images using known methods. For example, a well-known method for detection of so-called feature correspondences has been disclosed by Lowe [2]. This method, called SIFTS, detects corresponding feature points using a descriptor based on Difference of Gaussian. From these correspondences, corresponding color are extracted from the input images. For example, a Gamma-Offset-Gain model is estimated from the corresponding colors.

In color transfer, geometrical correspondences are not used. There is a case where precise geometrical correspondences are not meaningful because the two input images do not show the same semantic scene but are just semantically close. For example, the colors of an image of a first mountain scene shall be transformed into the colors of the image of a second mountain scene. In another case, the two input images show the same semantic scene, but still geometrical correspondences are not available. There are several reasons for that. First, for reasons of workflow order or computational time, geometrical correspondences are not available at the time of processing of color transfer. A second reason is that the number of reliable geometrical correspondences is not sufficient for color transfer, for example in low textured images.

One well known color transfer algorithm has been disclosed by Reinhard et al. [6]. They propose to transfer the first and second order image signal statics from the reference image to the corresponding target image. In order to be able to process the color channels separately, they use an empirical de-correlated color space.

When applying a known color mapping algorithm, the colors of corresponding features are exploited. If the image contains artifacts, the corresponding features may be erroneous. Image artifacts include noise, compression artifacts, and local color changes. Other effects, such as parallax or uncovered and covered image regions, lower the precision of feature correspondences or even cause outliers in the image correspondences. All such errors in feature correspondences will impact the precision of the estimated color mapping model.

Outlying feature correspondences can be detected using geometrical constraints. For example, known methods assume a plane 3D scene and estimate a geometric, projective transform describing the geometrical differences between two images [4]. Those feature correspondences that are outliers with respect to this estimation will not be used for estimation of the color mapping model. This approach does not work when the dynamics of the depth of the scene is high.

When applying a color transfer method to images that show the same semantic scene, all parts of the image will be exploited. However, the precision of the calculated color transform will suffer from the presence of image regions that have no correspondence in the other image, respectively. This can happen for the following cases:

Presence of cropping from one image to the other image;
Regions that are covered or uncovered by parallax effect;
Regions that are covered or uncovered by moving objects.

Those regions will nonetheless be processed by the color transfer algorithm. For example, the image statistics calculated by Reinhard et al. [6] will be influenced by such regions.

The invention aims to enhance robustness. For a given n-tuple of input images, and an initial set of n-tuples of corresponding feature points between the images of the n-tuple of input images, each feature point of an n-tuple of corresponding feature points being an image position in the corresponding image of the n-tuple of images, respectively, the invented method applies the following steps:

1. Estimate an initial color mapping model capable of compensating the image colors of the given, corresponding feature points of said set of n-tuples of corresponding feature points, the initial color mapping model being a color transform;

2. Defining a spatial neighborhood for each feature point in the corresponding image of said n-tuple of input images;

3. For all n-tuples of said set of n-tuples of corresponding feature points, compensate the color differences of the feature points and their spatial neighborhoods using said initial color mapping model;

4. Rejecting as outlier those n-tuples of corresponding feature points that have remaining color differences larger than a threshold to obtain a reduced set of n-tuples of corresponding feature points.

5. Estimate a refined color mapping model capable of compensating the image colors of the reduced set of n-tuples of corresponding feature points, the refined color mapping model being a color transform.

6. Setting the initial color mapping color transform to said refined color mapping color transform and go on with step 2.

Figure 9:
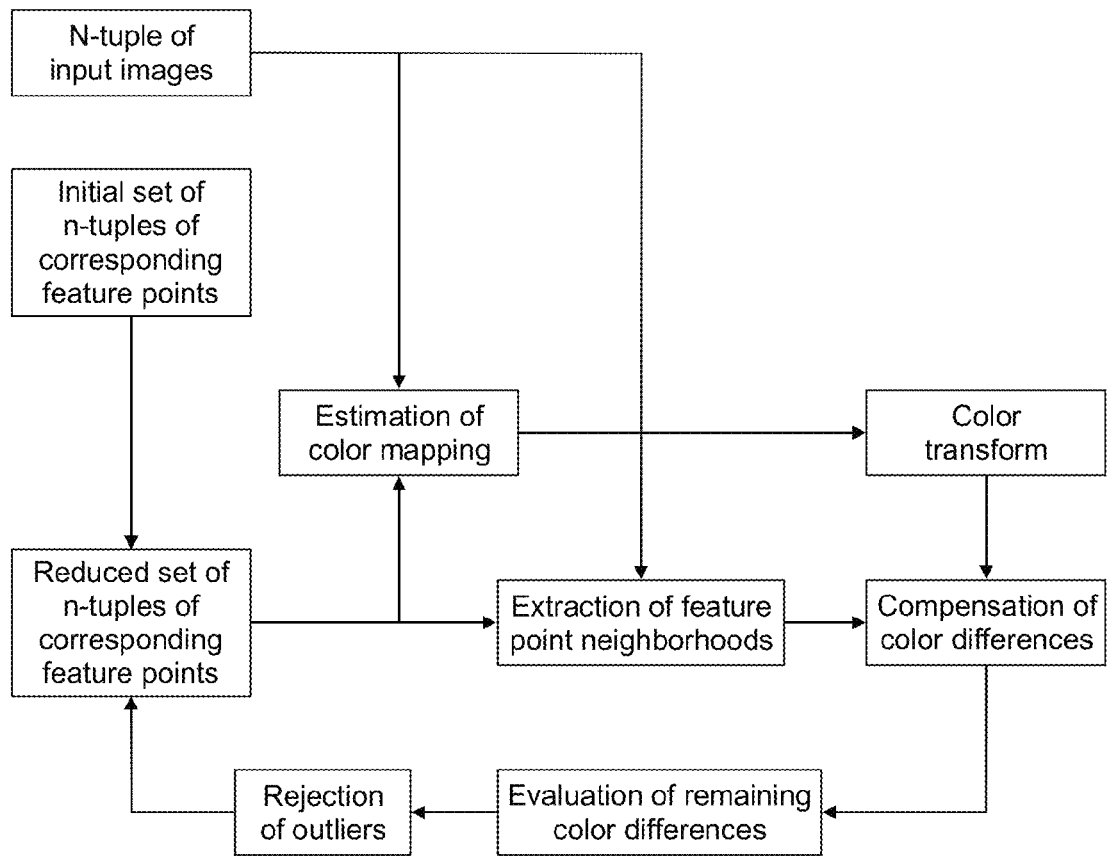

The block diagram in FIG. 9 illustrates said steps of the proposed system.

Possible Variations are, for example:
Making the threshold for remaining color differences local, for example setting it to the color difference before color mapping;
Using color ratios instead of color differences.

In the following, a sample implementation of the invented method for stereo images is presented. In this case, the n-tuple of input images is a pair of input images. The implementation employs the following steps:

Estimation of Corresponding Feature Points:

In case of stereo images, the initial set of n-tuples of corresponding feature points is an initial set of pairs of corresponding feature points, each feature point of a pair of corresponding feature points being an image position in the related image of the pair of stereo images, respectively. The corresponding feature points are calculated using the SIFT algorithm.

Estimation of an Initial Color Mapping Model:

The well-known color mapping method based on gain, offset and gamma—GOG [3]—is chosen and makes use of the colors of the corresponding feature points. The color transform is known as gain, offset and gamma—GOG—model.

Definition of a Spatial Neighborhood for Each Feature Point:

This will be explained below in more detail.

Compensation of Color Differences:

For all pairs of said set of pairs of corresponding feature points, the color differences of the feature points and their spatial neighborhoods are compensated using said initial color mapping model.

Rejection of Outliers:

Those n-tuples of corresponding feature points that have remaining color differences larger than a threshold are rejected, resulting in a reduced set of n-tuples of corresponding feature points.

Quality Evaluation and Iteration:

The initial color mapping color transform is set to said refined color mapping color transform. The process then returns to step 2.

Possible Variations are, for Example:

Having several first images and several second images;

Applying the same principle region by region to the images.

An important implementation detail is the limitation of image signal values. When applying the estimated color transform to an image, values smaller than the minimum value, usually zero, and larger than the maximum value, e.g. 255 in an image with 8 bit encoding of color coordinates, can occur. Reason is that either the model is not precise enough or that a single global model does not describe local color changes in the image. One possible solution is clipping of transformed colors to the allowed signal range. Another method is to use the constraint of a limited range during estimation of the color transform. The constraint should be that transformed colors lie within the allowed range. This can be included in estimation using estimation constraints.

The recommended method has the following advantages:

To be able to ensure color mapping even in presence of outliers and high depth dynamics.

To allow high precision color mapping even in presence of strong image noise and compression artifacts.

FIG. 1 shows a flowchart of outlier detection according to the invention.

The idea is to exploit the spatial neighborhood of the geometric feature correspondences in the left and right stereo images to remove outliers from the GFCs.

The recommended method differs from classical robust estimation and outlier detection in so far that the decision to use or not to use a feature point is not only based on the feature point itself but on the spatial neighborhood of the corresponding feature points in the original image and the target image.

The proposed method identifies those outliers whose color correspondences look very convincing, whereas their color neighborhoods reveal that the correspondence is not right. However, another unwanted and exceptional situation is that the neighborhood is similar but color correspondences are not similar. In that case the proposed method will miss the detection of an outlier.

It has been found that the recommended outlier detection and removal method improves classical outlier detection in two aspects. A first aspect is that it reduces the number of false positives in outlier detection. This means the number of cases is reduced where a CC is detected as an outlier but truly is not an outlier. As a result of reducing the false positives, the color mapping estimation model receives more valid information and thus achieves a better estimation. Secondly, also the number of false negatives is reduced. This means the number of cases is reduced where a CC is detected as valid but truly it is an outlier. Reducing false negatives is important as the color mapping model can be influenced by those missed outliers.

Let us analyze a particular example shown in FIG. 4. A dark black color A of a feature point in the left image corresponds to a dark grey color B of the corresponding feature point in the right image. Let's assume that initial color model estimation is complete, resulting in an initial color mapping model ICMM, where an outlier removal in difference to the method illustrated in FIG. 7 is performed after creating an initial model. Note that this estimation considers all color correspondences. The result of estimation is shown in FIG. 5, which is based on [5]. Let us further assume that these corresponding colors A and B are surrounded by lighter colors. In the case where the initial model ICMM cannot map the color A to color B, i.e. ICMM(A) is far away from B, this feature point will be declared as outlier by the classical robust estimation methods. Assuming that this decision is a false positive, it's the fault of the model ICMM that ICMM(A) does not give B. In other words, at least in dark colors such as A, the initial model ICMM is erroneous. The classical method will consider this feature as outlier, while it should not. As shown in FIG. 5, as AB or CD is far from initial estimation, classical method will consider those as outliers, whereas in reality they are not outliers.

The issue of classical robust estimation is that it solely depends on the initial model ICMM and the corresponding colors A and B.

To solve this issue, we propose to look into the neighborhoods of the feature points in the left image and the right image to decide about the outlier removal. It is quite probable that the neighborhood contains other colors than A in the left image and B in the right image. Let us assume that the neighborhood of color A contains some lighter colors. Let's further assume that the initial model is better for lighter colors than for darker colors. In this case, the model ICMM would work better in the neighborhoods of the colors A and B than for the colors A and B themselves. Therefore, the false positive decision is corrected and the feature point is not any longer detected as an outlier.

As it is an aspect of the present invention to provide improved outlier detection, for the sake of illustration and experiment any color mapping model may be used. Only as an example for an embodiment, in the following the GOG-model is used.

According to the flowchart of the recommended outlier detection illustrated in FIG. 1, let's consider the left image of the stereo pair of images is the reference image RI, whereas the right image of the stereo pair is the test image TI.

FIG. 1 shows the flowchart of the proposed outlier detection method, where Geometric Feature Correspondences and Color Correspondences are computed in a known manner first. Then, gamma, offset, gain estimation is performed and used to obtain the initial color-corrected test image ICTI. It is important to note that this primary color correction uses all CCs including outliers. Now, we will compare the neighborhoods of the Geometric Feature Correspondences of the initial color-corrected test image ICTI with the reference image RI, which according to the embodiment illustrated in FIG. 1 is the right image of the pair of images. As the color-corrected test image ICTI is already color compensated, the color distribution between neighborhoods—as predetermined pixel blocks—should be close, i.e. the remaining color differences in the neighborhoods should be below a certain threshold. If a neighborhood difference is below that threshold, then the Geometric Feature Correspondence is not an outlier, and vice-versa. The threshold is chosen as 2*σ, where σ² is the variance of the estimation error. The estimation error $C_{error}$ is described by the following equation 1, where $C_{ref}$ is the reference RGB color and $\hat{C}_{estimated}$ is the estimated RGB color provided by the gamma, offset, gain estimation.

$$C_{error} = C_{ref} - \hat{C}_{estimated} \qquad \text{Equation 1}$$

During neighborhood comparison, we should be concerned with some issues. For example, the comparison metric should be rotation invariant or invariant against other geometric transformations such as tilting. This means that if by chance the test image TI is rotated—or transformed—with respect to the reference image RI, then the recommended outlier detection method should not fail.

Large neighborhood seems to be good for a detection of more and more true positive outliers. However, computational costs get higher if bigger neighborhoods have to be compared. That's why for the purpose of the analysis of the effects of the proposed method for each Geometric Feature Correspondence we will start with a small neighborhood, such as 3×3 pixel blocks, then 5×5 pixel blocks, and so on. We will stop when the Geometric Feature Correspondence is declared as outlier or when a maximum neighborhood size and hence pixel block size is reached.

Figure 3:
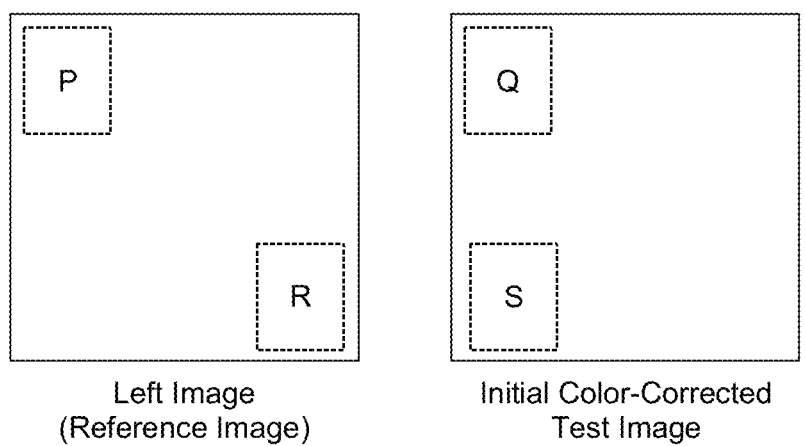

Let's analyze a simple scenario as shown in FIG. 3, where pixel blocks P and Q represent a good Geometric Feature Correspondence. This means that the image content of pixel block P in the left view is the same as the image content of pixel block Q in the GOG-corrected right image. In contrast, let's assume pixel blocks R and S have a bad Geometric Feature Correspondence. This simply means that the correspondence between the pixel blocks R and S is wrong, i.e. that pixel blocks R and S represent an outlier. The dotted boxes around the Geometric Feature Correspondences are the so called neighborhoods, e.g. a 7×7 pixel block. Note that the neighborhood can be defined by a circle or an ellipse or any other shape. Now, we will declare a Geometric Feature Correspondence as valid when for each channel independently, as e.g. R, G, B for red, green and blue, the absolute mean neighborhood difference between the reference image RI and the initial color-corrected test image ICTI is below the threshold. If the difference is larger than the threshold then the Geometric Feature Correspondence is an outlier.

A comparison of the classical outlier removal method with the proposed method is shown in the following table, where true positive means detected outliers are really outliers and false positive means detected outliers are not really outliers.

| Stereo Pair | neighbourhood | Classical method | Proposed method |
|---|---|---|---|
| Building | 5 × 5 | True positive: 6<br>False positive: 0<br>Missed: 5 | True positive: 7<br>False positive: 0<br>Missed: 4 |
| Building | 15 × 15 | True positive: 6<br>False positive: 0<br>Missed: 5 | True positive: 7<br>False positive: 0<br>Missed: 4 |
| Building | 25 × 25 | True positive: 6<br>False positive: 0<br>Missed: 5 | True positive: 8<br>False positive: 0<br>Missed: 3 |

The table shows an outlier removal method comparison for different sizes of the neighborhood and hence different pixel bock sizes.

Figure 11:
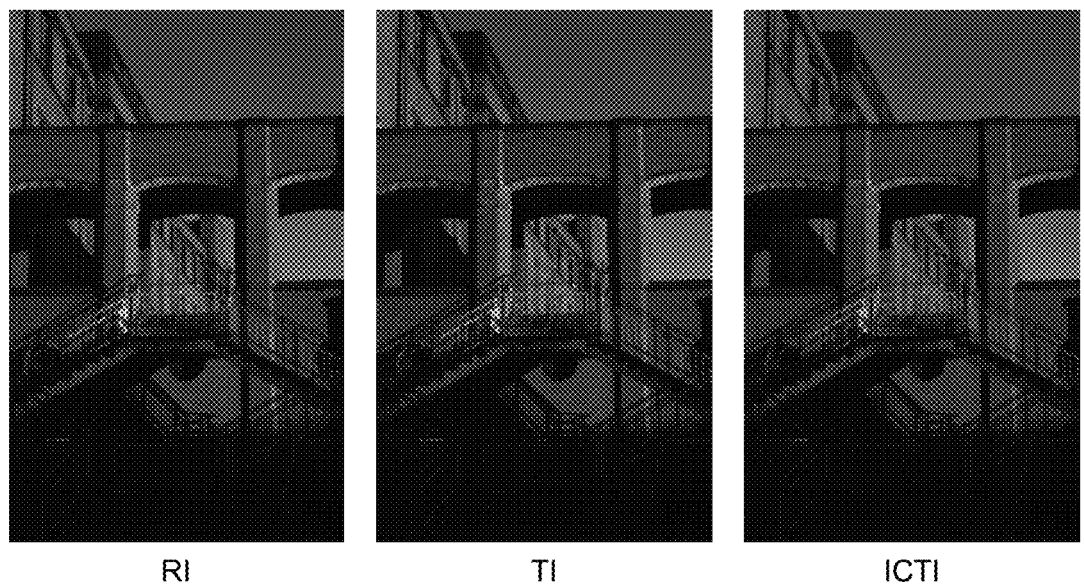

The results are based on the example shown in FIG. 11, where a reference image RI, a test image TI, and an initial color-corrected test image ICTI of a scene called 'Building' are presented. We have used a stereo database known as BOLD [7]. As the images in this database are very high-resolution images, for fast processing, images have been resized to 10% of their original size but with no compression.

Figure 12:
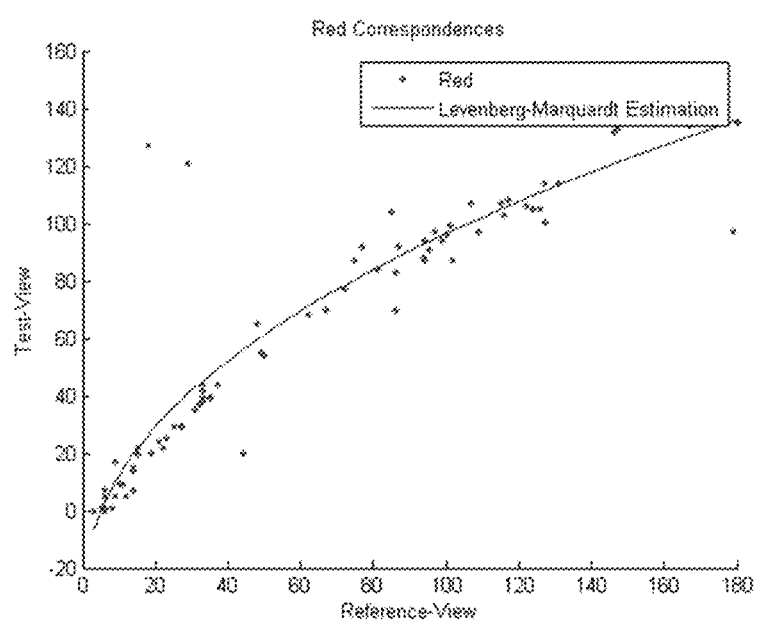
Figure 13:
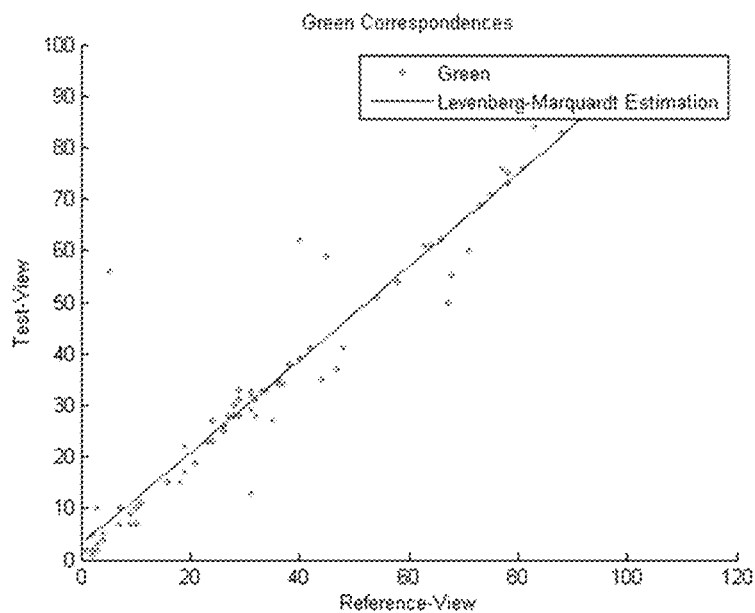
Figure 14:
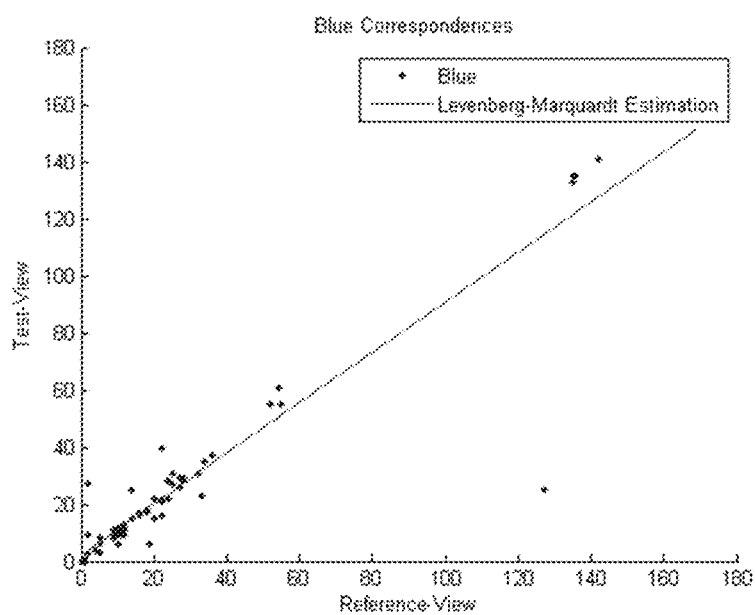
Figures 15, 16:
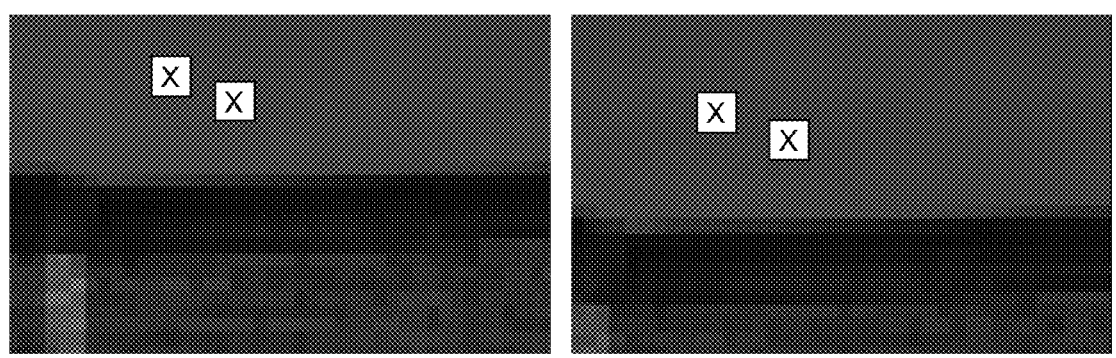
FIG. 16 illustrates missed outliers in a stereoscopic picture caused by a homogenous neighborhood.

FIG. 12, FIG. 13 and FIG. 14 show the Red, Green, and Blue channel estimation by nonlinear regression using Levenberg-Marquardt algorithm. After the regression the GOG-parameters for all three channels are available. If we apply this estimated model on the test image TI then we get the initial color-corrected test image ICTI as shown in FIG. 11. Now, we can start the proposed outlier removal technique. FIG. 15 illustrates a 3×3 pixel block neighborhood comparison where the threshold for color coordinate differences is chosen to be 8, wherein color coordinate difference means a difference between values representing a certain color value of the same color at a corresponding location.

For each channel, when the absolute difference of color coordinate values remains below the threshold, it is counted as a match, and whenever this is not the case, it is counted as a non-match. Notice that in the red channel there are more non-matches than matches, whereas in the green and blue channel there are more matches available. This shows that the red color correspondences are noisier than those of the green and blue channel. Let's analyze what is the global scenario. If we compare FIG. 12 to FIG. 14, then it can be seen that the red channel suffers from noise, more than the green and blue channels. The impact can be seen during outlier detection. This situation reveals the strength of the proposed method. Though one of the channel estimations is noisier, this will not result in a false positive during the outlier detection if the others are less noisy. One channel may show less match, but the other channels will compensate this. This means that one single decision —outlier or not outlier—is taken for all three color channels of a block. At the end of outlier removal, it can be seen that the proposed method has detected 7 outliers and all of them are true positive.

There are several possibilities to perform said neighborhood comparison with more or less success as will be shown in the following.

Let us remind that the neighborhood comparison of a feature correspondence is carried out between the reference image and the initial color-corrected test image. Note that the comparison process is done channel-wise and for the sake of discussion it is assumed that the neighborhood size is a 3×3 pixel block. We will show several possible ways to compare the neighborhood and their advantage and disadvantages.

In the first comparison method, for each channel we may compute the absolute difference between the mean color coordinates of corresponding neighborhoods, as shown by equation 2 below. Here, $\text{diff}_{p \times p}$ refers to the difference of a p×p window around the GFC. $C_{ref}$ and $C_{ict}$ refer to the colors of the reference image RI and the initial color-corrected test image ICTI, respectively.

$$\text{diff}_{p \times p} = \text{abs}\left(\frac{1}{p^2}\sum_{i=0}^{p^2-1} C_{ref} - \frac{1}{p^2}\sum_{i=0}^{p^2-1} C_{ict}\right) \qquad \text{Equation 2}$$

After the computation of absolute differences for all three color channels, if the majority of differences are less than a threshold, which is a predetermined color coordinate difference, then the Geometric Feature Correspondence is not an outlier, and vice-versa, as shown in equation 3 for one single color channel.

$$\text{Is outlier} = \begin{cases} \text{no,} & \text{diff}_{p \times p} \leq \text{threshold} \\ \text{yes,} & \text{diff}_{p \times p} > \text{threshold} \end{cases} \quad \text{Equation 3}$$

The main disadvantage of this type of comparison of overall mean values is that it literally assumes the color mapping as linear. But the neighborhood may contain any color, and thus taking the average will not only miss a lot of outliers, but also will notably increase false positives.

Figure 2:
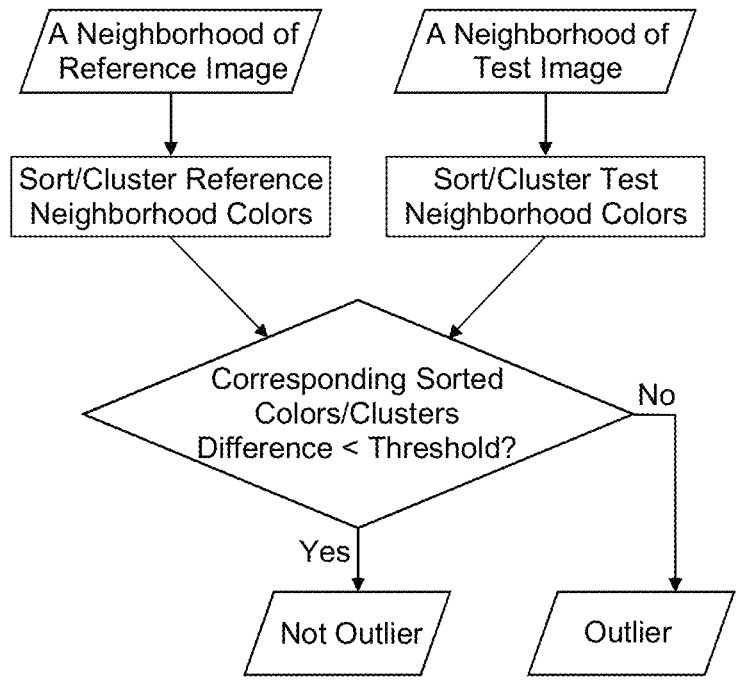

The second comparison method is to cluster the colors first and then to compare corresponding clusters, as shown in the flow diagram in FIG. 2. FIG. 2 illustrates that the colors in the neighborhood of a feature point in the reference image are clustered and sorted and compared to the colors in the neighborhood of the corresponding feature point in the test image that are clustered and sorted, too. If the absolute difference of colors is larger than a predetermined threshold, the color is declared to be an outlier. A k-means clustering method could be used, where the mean of the cluster could be compared according to threshold criteria. K-means clustering is a well-known method and can be understood as a method of cluster analysis, which aims at partitioning n observations into k clusters in which each observation belongs to the cluster with the nearest mean value. When comparing colors, the colors are ordered in color space in order to compare potentially corresponding colors. This second comparison method is more robust than the first comparison method, as in this case the non-linear mapping is divided into several linear mappings. Still, it cannot prevent a lot of false positives.

The described comparison methods use two parameters that need to be chosen thoroughly. The first parameter is the window size of the neighborhood window. If the window size is too small, relevant information for outlier detection is missing and the performance of the method will be limited. If the window size is too large, geometric distortions between the images lead to non-corresponding colors with negative impact on the performance. A practical compromise is to link the window size to the width of the image by choosing a window size as one percent of image width. For example, for HDTV images having a width of 1080 pixels, a window size of an 11×11 pixel block is appropriate. A second parameter is the number of clusters to be chosen. If the number of clusters is too small, the information of the neighborhood window is badly represented and the method of outlier detection will suffer from loss of performance. Small numbers of clusters are even more inappropriate the less linear is the color mapping model and the smaller are details in the image. If the number of clusters is too high, the method of outlier detection will suffer from image noise present in the images and geometric distortions between the images. For the indicated window size, we used four clusters. With fours clusters, binary patterns as edges and lines as well as non-binary pattern as grey ramps and color ramps can be represented sufficiently precise. Other parameter values, e.g. dependent on the size of image details, image noise, geometric distortions and the type of color mapping model, may be used under specific conditions.

A third possibility for comparing neighborhoods is a modification of the second comparison method in such a way that a maximum number of color clusters is used. In other words, this simply means sorting the corresponding colors and then comparing the individual colors in the sorted list according to the threshold criterion. The following equations 4 and 5 describe the method, where $C'_{ref}(i)$ and $C'_{ict}(i)$ refer to the $i^{th}$ sorted color of the reference image RI and the initial color-corrected test image ICTI, respectively. The main strength of this method is not only the fact that it is rotation invariant but that it is also robust against false positives.

$$\begin{cases} \text{match,} & \text{abs}(C'_{ref}(i) - C'_{ict}(i)) \leq \text{threshold} \\ \text{nonmatch,} & \text{abs}(C'_{ref}(i) - C'_{ict}(i)) > \text{threshold} \end{cases} \quad \text{Equation 4}$$

$$\begin{cases} \text{outlier,} & \text{Total match} < \text{Total nonmatch} \\ \text{not outlier,} & \text{Otherwise} \end{cases} \quad \text{Equation 5}$$

A fourth comparison method for neighborhood comparison is a direct pixel to pixel comparison according to threshold criteria, wherein the top-left pixel of pixel block P is compared with the top-left pixel of pixel block Q and so on. For each color channel, said comparison decides whether it is a match or a non-match. After performing the same operations for all three channels, if the total number of matches is more than the total number of non-matches, it is determined that the Geometric Feature Correspondence is not an outlier, and vice-versa. The basis of this approach is very similar to equation 4 and equation 5, except the fact that the colors are not sorted. Rather they are compared according to their spatial position. The main disadvantage with this approach is that it is not invariant against rotation.

Therefore, with respect to the illustration in FIG. 3, the following variation of the fourth method is recommended. If in a color channel the absolute difference between the color coordinates of two corresponding pixels is below a predetermined threshold, then a match counter is incremented. Similarly, if the absolute difference between color coordinates is equal to or larger than said threshold, then a non-match counter is incremented. Said steps are repeated for all color channels, e.g. R, G, B. After that, the total number of matches and non-matches is counted for pixel block P and pixel block Q. If the total number of matches is larger than the total number of non-matches, then the pixel blocks P and Q are declared as valid. Otherwise, the Geometric Feature Correspondence is declared as an outlier. The method is e.g. realized according to the flowchart shown in FIG. 2.

In the following, a critical judgment of the proposed method mainly concerning two aspects is discussed. The first one is related to what are the situations when the proposed method will miss a certain outlier and why. The second aspect is related to the question whether an increase of the size of the neighborhood will result in more true positives.

If we compare all feature correspondences with ground truth, then we can see that for a certain neighborhood size, some of the outliers are missed by the proposed method. Some of the examples and justification of why those are missed are given below.

Homogeneous Region:

If the neighborhood contains only regions with homogeneous color, then it is more probable that some outliers will be missed. For example, above the building in FIG. 11 we can see a part of the sky. The proposed method has missed one outlier from the sky because the neighborhoods of the correspondences are very similar.

FIG. 16 illustrates missed outliers, which are the pixels designated by 'X'. Such missed outliers are caused by the homogenous neighborhood.

Homogeneous Dark Region:

In FIG. 11 the sun creates a shade on the wall, which is dark. The proposed method missed one point because the background brick color neighborhood for 7×7 or 15×15 pixel blocks is similar. With a neighborhood size of a 25×25 pixel block the method has correctly detected this as an outlier.

Figure 17:
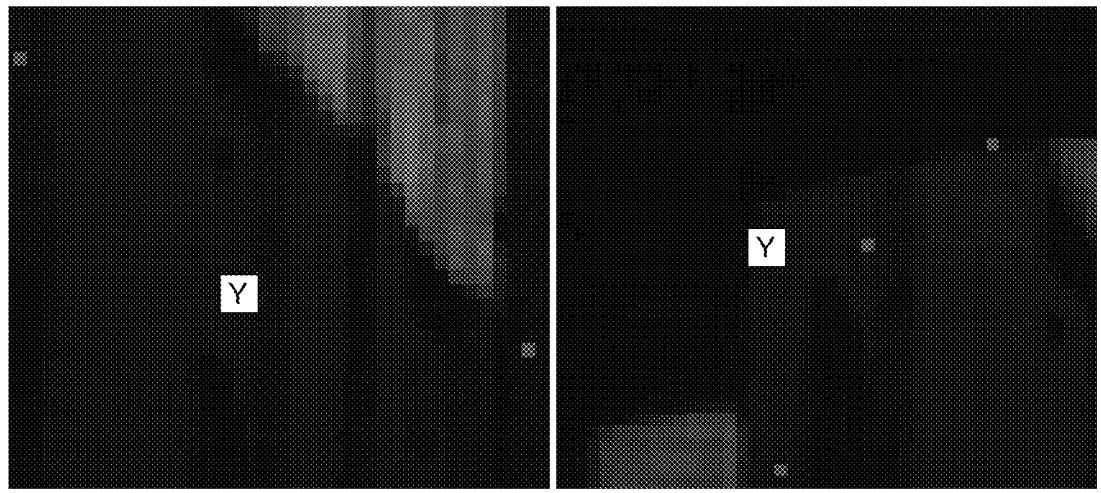
FIG. 17 illustrates outlier pixels in a dark brick color neighborhood with a 25×25 pixel block neighborhood detection.

FIG. 17 shows in a left image for illustration purposes a pixel designated by 'Y' in a dark area of the reference image RI illustrated in FIG. 11 and in the right image a corresponding pixel in the initial color-corrected test image ICTI determined by SIFT and located in a different area of the image. This outlier is missed with a 7×7 as well as a 15×15 pixel block neighborhood processing. However, it has been detected as an outlier with a 25×25 pixel block neighborhood processing.

Though the proposed method missed some outliers which are in a homogeneous or similar neighborhood. However, these are not the worst type for the color estimation model and nevertheless may be detected by using an extended pixel block size neighborhood processing.

Figure 18:
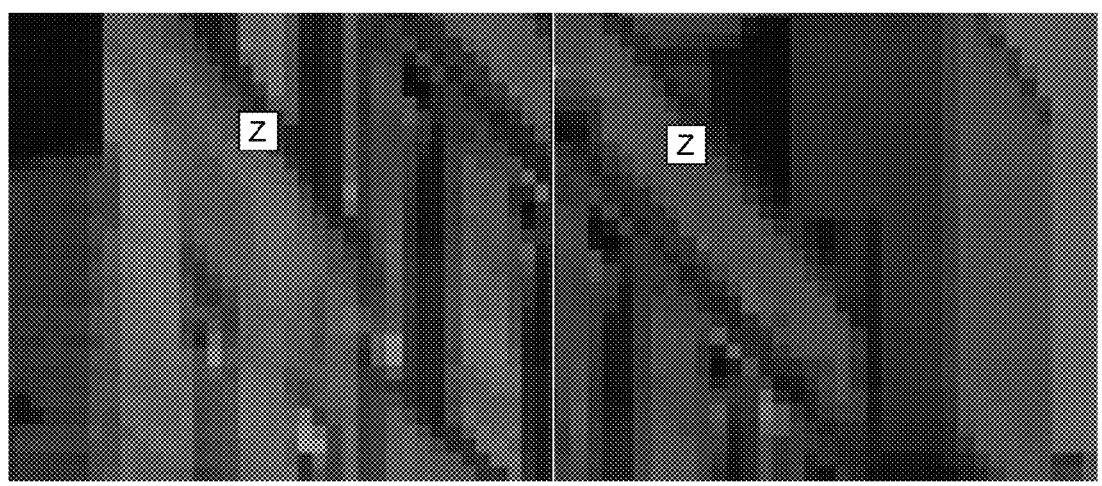
FIG. 18 illustrates a missed outlier caused by similar neighborhood patterns in the compared images.

Repetitive Pattern:

A neighborhood pattern at a roof corner comprising bricks and a part of the roof has been matched by chance with a part of the wall, as shown in FIG. 18.

FIG. 18 illustrates images of the roof corner of the top floor matched with a window corner, wherein both have similar neighborhoods. The two areas show a similar pattern designated by 'Z', so that the proposed method missed this outlier.

As the proposed method determines outliers by comparing the neighborhoods, the size of the neighborhood has an important impact on the performance of outlier detection as shown above. It has been observed that as the neighborhood size is increasing, the outlier detection performance also increases up to a certain threshold, as starting with a certain pixel block size, also the chance of the occurrence of a match increases, which by chance is related to a different location.

Consequently, efficient outlier detection, especially in view of the necessary computing power, is performed up to a certain pixel block size. Nevertheless, as the comparison of outlier detection methods has shown above, the recommended method improves the outlier detection.

The recommended method has two main advantages over the existing methods. The first advantage comes from the fact that it is more robust and that it is easier to analyze an initial color-corrected test-view than a non color-corrected image. The second advantage is the exploitation of spatial neighborhood of the initial color-corrected test-view.

In a stereo workflow, color difference compensation is often the first step so that other steps, such as disparity estimation or compression, can benefit as shown in FIG. 8, which is based on [5].

One approach for the compensation of color differences between images is color mapping. In a stereo application, color mapping assumes that left and right images contain almost the same scene. In other words, there is a strong semantic relationship between the images. FIG. 7, which is based on [5], shows the basic steps of color mapping. It typically starts by finding the Geometric Feature Correspondences GFC [1] using methods such as Scale Invariant Feature Transform SIFT [2] or simply normalized cross correlation [3]. GFCs are a list of pairs of corresponding feature points in the left image and the right image. As GFC computation is not free from errors, some of the corresponding feature points are wrong and are called outliers. So, in the next step, those outliers are usually removed from the GFCs. Then, color coordinates, such as typically R, G, and B for red, green and blue, are retrieved from the two images using the feature correspondences. We call these retrieved colors Color Correspondences CC. Finally, the CCs are used to fit a color model. This model describes the relationship between the correct view and the view to be corrected. If this model is applied to the view to be corrected then it will compensate the color differences.

In the literature, different color mapping models are proposed. A classical parametric model is the GOG—model, which is based on the camera characteristics [3]. A global, data-driven, look up table based model is used in [1] and [8]. [9] proposes a local, region-based color mapping model with just a simple, constant color offset per region.

However, the outlier removal step is significant for all color mapping models because for example, if a GFC lies in a highly textured region, a small error in the spatial position of the GFC can generate a large error in the CC. Therefore, a robust outlier removal method is necessary.

In this context of color correction for stereo, the proposed method recommends to remove outliers from the GFCs by exploiting the color information of the spatial neighborhoods in the stereo images. Unlike the existing methods, the recommended method will not remove the outliers immediately after computing GFCs. It will rather try to color-correct the image with computed GFCs first and then it will analyze the spatial neighborhoods to decide which GFCs are outliers. In other words, the method differs in so far that the decision to use or not to use an observation is not only based on the feature point itself but also on its spatial neighborhood.

A classical way of dealing with outliers is to use all available CCs for estimation of an initial color mapping model. Then, around the estimated initial color mapping model curve, a confidence corridor is chosen based on the assumption that the initial estimation result is close to the ground truth. All CCs outside the corridor are considered to be outliers and thus removed from estimation. The remaining CCs are so called valid CCs and estimation is done once again. This estimated model is expected to be free from the influence of outliers. The limitation of this method is that if the initial estimation is far from ground truth, then this outlier detection technique will miss a wide range of true outliers as well as mistakenly detect some truly valid CCs as outliers. Another limitation is that outlier removal is often done channel-wise, which may raise inconsistency between channels. For example, the red channel of a pixel considers a CC as valid but the blue channel of the pixel may not agree. In that case, if we declare the blue channel information as outlier and at the same time the red channel information as valid, then it's inconsistent for the color estimation model. On the other hand, if we remove the whole pixel information from all three channels, then we are losing information from estimation.

In summary, this outlier detection method is an application of robust estimation. Robust estimation associates less weight or even no weight to observations that contribute large cost to the cost function. Here, a binary weight is used, i.e. either observations are used for estimation or they are declared as outliers. A classical outlier removal is illustrated in FIG. 6, which is based on [5], wherein the middle curve represents the initial estimation using all CCs. Then a region shown by dotted curves is chosen for removing outliers by declaring CCs inside said dotted curves as valid CCs and CCs outside as outliers. However, as shown in FIG. 4 and described above, classical outlier removal fails, for example, if corresponding colors A and B are surrounded by lighter colors. Said disadvantage of classical outlier removal is avoided by the proposed method by looking into the feature point's neighborhoods in the left and the right images to decide about the outlier removal.

Figure 10:
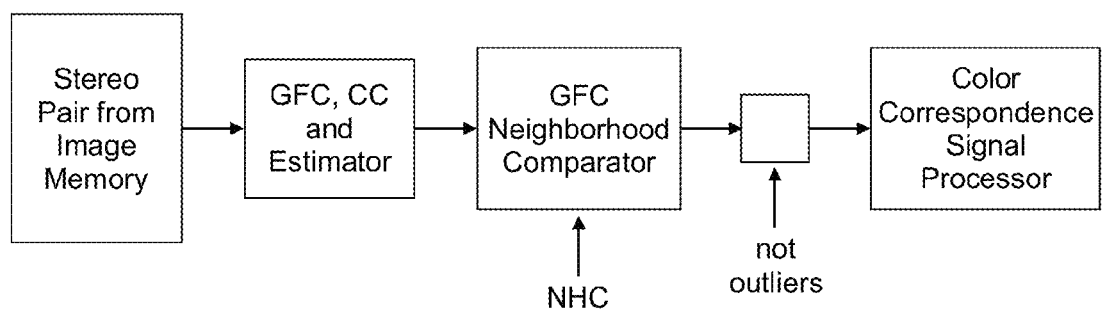

An arrangement to perform the recommended method is illustrated in a block diagram shown in FIG. 10, wherein a neighborhood comparator NHC is arranged between means providing an initial color-corrected test image, i.e. a GFC and CC determining and color model estimation block, e.g. a processor, and a means for providing a corrected color correspondence of the stereo pair of input images, e.g. a color correspondence signal processor. The improved outlier detection is performed by said neighborhood comparator NHC, which provides those GFCs that are not outliers for further processing, e.g. to the color correspondence signal processor. An embodiment of the neighborhood comparator NHC is illustrated in FIG. 2, illustrating a method and an arrangement of a neighborhood comparator NHC. That means that method and arrangement are based on the same structure, wherein the difference between corresponding sorted colors and/or clusters is compared with a predetermined threshold to provide improved outlier detection for reliable color mapping.

Although the invention has been shown and described with respect to specific embodiments thereof, it should be understood by those skilled in the art that the foregoing and various other changes, omissions and additions in the form and detail thereof may be made therein without departing from the spirit and scope of the claims.

REFERENCES

[1] M. P. Tehrani et al.: "Iterative color correction of multicamera systems using corresponding feature points", Journal of Visual Communication and Image Representation, Vol. 21(2010), pp. 377-391.

[2] D. G. Lowe: "Distinctive image features from scale-invariant keypoints", International Journal of Computer Vision, Vol. 60 (2004), pp. 91-110.

[3] J. I. Jung et al.: "Color Corrected Newspaper Sequence for 3D Video Coding" ISO/IEC JTC1/SC29/WG11, m19282 (2011), pp. 001-003.

[4] A. Efros: "Feature Matching and RANSAC" course 15-463 at Carnegie Mellon University in 2005 on Computational Photography, Lecture of 01 NOV. 2005 (http://graphics.cs.cmu.edu/courses/15 -463/2005_fall/www/Lectures/RANSAC.pdf).

[5] J. I. Jung et al.: "Color correction algorithm based on camera characteristics for multi-view video coding", Signal, Image and Video Processing, Vol. 8 (2014), pp. 955-966.

[6] E. Reinhard et al.: "Color Transfer between Images", IEEE Computer Graphics and Applications, Vol. 21 (2001), pp. 34-41.

[7] X. Jiang et al.: "Correlation-based Intrinsic Image Extraction from a Single Image", Proceeding of the 11th European Conference on Computer Vision (ECCV), Lecture Notes in Computer Science, Vol. 6314 (2010), pp. 58-71.

[8] K. Yamamoto et al.: "Color correction for multi-view video using energy minimization of view networks", International Journal of Automation and Computing, Vol. 5 (2008), pp. 234-245.

[9] Q. Wang et al.: "A Robust Algorithm for Color Correction between Two Stereo Images", Proceedings of the 9th Asian conference on Computer Vision-Part II (ACCV'09) (2009), pp. 405-416.

The invention claimed is:

1. A method for outlier detection for color mapping, the method comprising:

retrieving a reference image and a test image;

determining a set of pairs of corresponding feature points between the reference image and the test image, for each pair of the determined set there is a feature point in the reference image and a corresponding feature point in the test image;

determining an initial color mapping model for each pair of corresponding feature points between the test image and the reference image;

applying the initial color mapping model to the test image to generate an initial color-corrected test image;

for each pair of corresponding feature points of the determined set of pairs, comparing color values of a spatial area around the feature point in the reference image with color values of a spatial area around the corresponding feature point the initial color-corrected test image;

when said comparison of color values related to a given pair of corresponding feature points meets a threshold criteria, deleting the given pair of corresponding feature points to generate a reduced set of pairs of corresponding feature points; and processing the reduced set of corresponding feature points for transmission to a signal processor.

2. The method according to claim 1, wherein the corresponding feature points are determined using Geometric Feature Correspondences.

3. The method according to claim 1, wherein the reference image and the test image are images of a stereo pair.

4. The method according to claim 1, further comprising:

determining a refined color mapping model from image colors of the reduced set of pairs of corresponding feature points for mapping image colors of the reduced set of pairs of corresponding feature points between the test image and the reference image;

applying the refined color mapping model to the test image to generate a refined color-corrected test image;

for each non-deleted pair of corresponding feature points, comparing color values of a spatial area around a feature point of a non-deleted pair, which belongs to the reference image, with color values of a corresponding spatial area around the other feature point of the non-deleted pair, which belongs to the refined color-corrected test image; and when the comparing of color values meets a threshold criteria for a given non-deleted pair of corresponding feature points, deleting the given non-deleted pair of corresponding feature points to generate a further reduced set of pairs of corresponding feature points.

5. The method according to claim 1, wherein determining the initial color mapping model comprises determining Color Correspondences.

6. The method according to claim 1, wherein the threshold is determined as a variance of an estimation error determined as a difference between a reference color and an estimated color.

7. The method according to claim 1, wherein said comparison of color values is based on an absolute difference between mean color values of colors in said corresponding spatial areas for each color channel, and wherein deleting a pair is performed if said absolute difference exceeds a threshold for a majority of color channels.

8. The method according to claim 1, wherein the initial color mapping model is a color transform.

9. The method according to claim 1, wherein the initial color mapping model is a gamma-offset-gain-model.

10. The method according to claim 1, wherein said comparison of color values is performed directly pixel to pixel in said corresponding spatial areas to decide whether pixels of each pixel to pixel comparison match together, and wherein deleting a pair is performed if a total number of pixel to pixel matches in the corresponding spatial areas of the given pair of corresponding feature points is below a threshold.

11. The method according to claim 1, comprising clustering colors of corresponding spatial areas of each pair, wherein said comparison of color values is based on a difference computed between colors of color clusters that correspond in said corresponding spatial areas and wherein deleting a pair is performed if the difference computed for the given pair of corresponding feature points exceeds a threshold.

12. An image processing apparatus for outlier detection for color mapping, the image processing apparatus comprising:
a memory; and
at least one processor configured to:
determine a set of pairs of corresponding feature points between a reference image and a test image, for each pair of the determined set there is a feature point in the reference image and a corresponding feature point in the test image,
determine an initial color mapping model for each pair of corresponding feature points between the test image and the reference image,
apply the initial color mapping model to the test image to generate an initial color-corrected test image;
for each pair of corresponding feature points of the determined set of pairs, compare color values of a spatial area around the feature point in the reference image with color values of a spatial area around the corresponding feature point of the initial color-corrected test image;
delete a given pair of corresponding feature points to generate a reduced set of pairs of corresponding feature points, when said comparison of color values related to the given pair of corresponding feature points meets a threshold criteria; and
process the reduced set of pairs of corresponding feature points for transmission to a signal processor.

13. The image processing apparatus according to claim 12, wherein the at least one processor is configured to determine the corresponding feature points using Geometric Feature Correspondences.

14. The image processing apparatus according to claim 12, wherein the reference image and the test image are images of a stereo pair.

15. The image processing apparatus according to claim 12, wherein the at least one processor is further configured to:
determine a refined color mapping model from image colors of the reduced set of pairs of corresponding feature points for mapping image colors of the reduced set of pairs of corresponding feature points between the test image and the reference image;
apply the refined color mapping model to the test image to generate a refined color-corrected test image;
for each non-deleted pair of corresponding feature points, compare color values of a spatial area around a feature point of the non-deleted pair belonging to the reference image with color values of a corresponding spatial area around the other feature point of the non-deleted pair belonging to the refined color-corrected test image; and
when said comparison of color values related to a given non-deleted pair of corresponding feature points meets said threshold criteria, delete the given non-deleted pair of corresponding feature points to generate a further reduced set of pairs of corresponding feature points.

16. The image processing apparatus according to claim 12, wherein the at least one processor is configured to determine Color Correspondences for determining the initial color mapping model.

17. The image processing apparatus according to claim 12, wherein the at least one processor is configured to determine the threshold as a variance of an estimation error determined as a difference between a reference color and an estimated color.

18. The image processing apparatus according to claim 12, wherein the at least one processor is configured to compare color values based on an absolute difference between mean color values of colors in said corresponding spatial areas for each color channel, and to delete a pair if said absolute difference exceeds a threshold for a majority of color channels.

19. The image processing apparatus according to claim 12, wherein the initial color mapping model is a color transform.

20. The image processing apparatus according to claim 12, wherein the initial color mapping model is a gamma-offset-gain-model.

21. The image processing apparatus according to claim 12, wherein the at least one processor is also configured to perform said comparison of color values directly pixel to pixel in said corresponding spatial areas to decide whether pixels of each pixel to pixel comparison match together, and to delete a pair if a total number of pixel to pixel matches in the corresponding spatial areas of the given pair of corresponding feature points is below a threshold.

22. The method according to claim 12, wherein the at least one processor is also configured to cluster colors of corresponding spatial areas of each pair, to compare color values based on a difference computed between colors of color clusters that correspond in said corresponding spatial areas and to delete a pair if the difference computed for the given pair of corresponding feature points exceeds a threshold.

* * * * *